(12) United States Patent
Shon et al.

(10) Patent No.: US 10,156,333 B2
(45) Date of Patent: Dec. 18, 2018

(54) LAMP FOR VEHICLE

(71) Applicant: SL Corporation, Daegu (KR)

(72) Inventors: Wooyeong Shon, Daegu (KR); Sunkyoung Park, Daegu (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 15/852,419

(22) Filed: Dec. 22, 2017

(65) Prior Publication Data

US 2018/0180240 A1 Jun. 28, 2018

(30) Foreign Application Priority Data

Dec. 27, 2016 (KR) .................. 10-2016-0179968

(51) Int. Cl.
| | |
|---|---|
| *F21S 41/36* | (2018.01) |
| *F21S 41/663* | (2018.01) |
| *B60Q 1/14* | (2006.01) |
| *B60Q 1/00* | (2006.01) |
| *F21S 41/19* | (2018.01) |
| *F21S 41/33* | (2018.01) |
| *F21S 41/365* | (2018.01) |
| *F21S 41/148* | (2018.01) |
| *F21W 102/13* | (2018.01) |

(52) U.S. Cl.
CPC ............ *F21S 41/36* (2018.01); *B60Q 1/0041* (2013.01); *B60Q 1/14* (2013.01); *F21S 41/148* (2018.01); *F21S 41/19* (2018.01); *F21S 41/336* (2018.01); *F21S 41/365* (2018.01); *F21S 41/663* (2018.01); *F21W 2102/13* (2018.01)

(58) Field of Classification Search
CPC ........ F21S 41/36; F21S 41/663; F21S 41/365; F21S 41/336; F21S 41/148; F21S 41/19
See application file for complete search history.

(56) References Cited

U.S. PATENT DOCUMENTS

2009/0251916 A1* 10/2009 Tanaka ................. B60Q 1/04
362/538

FOREIGN PATENT DOCUMENTS

| JP | 2006-134713 A | 5/2006 |
|---|---|---|
| KR | 10-2016-0123138 | 10/2016 |

* cited by examiner

*Primary Examiner* — Anne M Hines
(74) *Attorney, Agent, or Firm* — Mintz Levin Cohn Ferris Glovsky and Popeo, P.C.; Kongsik Kim; Jhongwoo Jay Peck

(57) ABSTRACT

A lamp for a vehicle is provided. The lamp includes a first lamp unit that includes a first light source portion and a first reflection portion having a reflection surface which forms a first beam pattern by reflecting light generated by the first light source portion in a forward direction. A second lamp unit is located on one side of the first lamp unit and includes a second light source portion and a second reflection portion having a reflection surface which forms a second beam pattern by reflecting light generated by the second light source portion in a forward direction. The first lamp unit includes a main reflection pattern formed on an outer wall portion disposed on a side of the first reflection portion and reflects a part of the light generated by the first light source portion toward the second reflection portion.

12 Claims, 16 Drawing Sheets

LAMP FOR VEHICLE

CROSS-REFERENCE TO RELATED APPLICATION

This application claims priority from Korean Patent Application No. 10-2016-0179968 filed on Dec. 27, 2016, the disclosure of which is incorporated herein by reference in its entirety.

TECHNICAL FIELD

The present disclosure relates to a lamp for a vehicle, and more particularly, to a lamp for a vehicle, capable of forming a variety of beam patterns based on a driving situation of the vehicle.

RELATED ART

Generally, a vehicle includes a variety of types of lamps having a lighting function for more easily recognizing an object positioned proximate to the vehicle during low light conditions (e.g., at night) and a signaling function for informing other vehicles proximate to the vehicle or pedestrians of a driving state of the vehicle. For example, a headlamp, a fog lamp, and the like generally include the lighting function. A turn signaling lamp, a tail lamp, a brake lamp, a side marker, and the like generally include the signaling function. Installation criteria and specifications for the lamps are regulated by law to enable each lamp to adequately perform the intended function.

Among lamps for a vehicle, the headlamp performs a function for driving safety by forming a low beam pattern or a high beam pattern to provide a driver's front view during low light conditions (e.g., nighttime driving). The head lamp forms different beam patterns such as the low beam pattern, the high beam pattern, and the like based on driving conditions of the vehicle. For example, the headlamp includes a lamp unit which forms the low beam pattern, and together with a lamp unit which forms a pattern for providing a distant view, it is possible to form the low beam pattern or the high beam pattern according to the driving conditions of the vehicle. The head performs a basic function for safe driving by providing the driver's view and forms a significant component of the external appearance of the vehicle while driving at night. Accordingly, a method of improving aesthetics by providing more natural lighting using a head lamp is necessary.

The above information disclosed in this section is merely for enhancement of understanding of the background of the disclosure and therefore it may contain information that does not form the prior art that is already known in this country to a person of ordinary skill in the art.

SUMMARY

Aspects of the present disclosure provides a lamp for a vehicle, which forms a lighting image by using some of a plurality of lamp units, turning off while others are turned on, forming a particular beam pattern.

In an aspect of an exemplary embodiment of the present disclosure, a lamp for a vehicle may include a first lamp unit having a first light source portion and a first reflection portion which includes a reflection surface which forms a first beam pattern by reflecting light generated by the first light source portion forward and a second lamp unit disposed on one side of the first lamp unit and having a second light source portion and a second reflection portion which includes a reflection surface which forms a second beam pattern by reflecting light generated by the second light source portion forward. Additionally, the first lamp unit may include a main reflection pattern formed on an outer wall portion disposed on at least one side of the first reflection portion and configured to reflect a part of the light generated by the first light source portion toward the second reflection portion.

In some exemplary embodiments, the first lamp unit and the second lamp unit may be arranged in a direction of the vehicle's width, and the first lamp unit may be disposed closer to the exterior of the vehicle in comparison to the second lamp unit. The first beam pattern may be a low beam pattern, the second beam pattern may be a long distance view pattern for providing a long distance view and may be combined with the low beam pattern to form a high beam pattern.

In other exemplary embodiments, the first reflection portion may include a first reflection surface which forms a high illuminance area for the first beam pattern and a second reflection surface which forms a spread area for the first beam pattern. The main reflection pattern may be disposed on a side of the reflection surface which forms the spread area. The first light source portion may be disposed above the first reflection portion, and the main reflection pattern may be formed on the outer wall portion formed at a bottom end of the first reflection portion.

Additionally, the second reflection portion may include a plurality of reflection surfaces, and the main reflection pattern reflects light toward at least one of the plurality of reflection surfaces. The second reflection portion may include an additional reflection pattern which is formed on an outer wall portion disposed on a side of the second reflection portion and reflects light reflected by the main reflection pattern toward the second reflection portion.

In another exemplary embodiment, the second reflection portion may include a plurality of reflection surfaces, and the additional reflection pattern may reflect light reflected by the main reflection pattern toward at least one of the plurality of reflection surfaces. The additional reflection pattern may be formed on an outer wall portion disposed adjacent the second reflection portion. The additional reflection pattern may be formed on an outer wall portion disposed at a top end of the second reflection portion.

In some exemplary embodiments, the first lamp unit may form a first lighting image using light generated from the first light source portion, and the second lamp unit may form a second lighting image using light reflected by the main reflection pattern among the light generated from the first light source portion. Additionally, a brightness level of the second lighting image may be less than a brightness level of the first lighting image.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
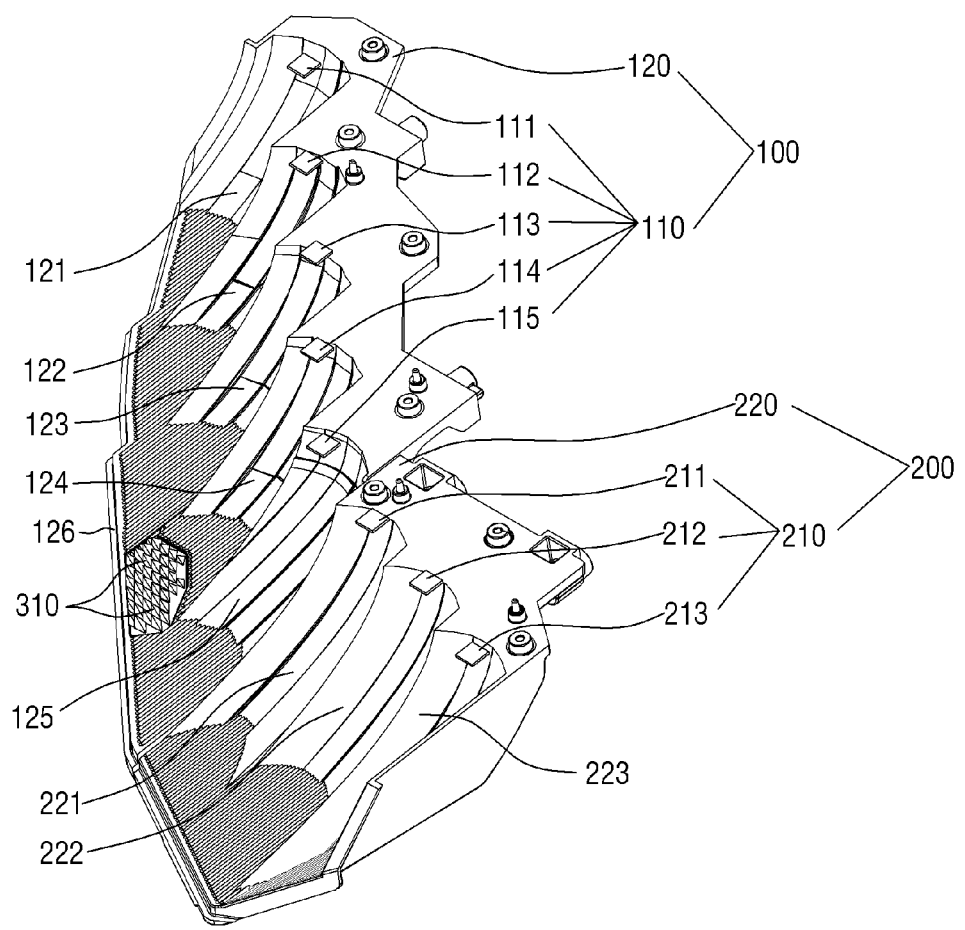
FIGS. 1 and 2 are exemplary perspective views of a lamp for a vehicle according to an exemplary embodiment of the present disclosure.

Advantages and features of the present disclosure and a method of achieving the same will become apparent with reference to the attached drawings and embodiments described below in detail. However, the present disclosure is not limited to the exemplary embodiments described below and may be embodied with a variety of different modifications. The embodiments are merely provided to allow one of ordinary skill in the art to completely understand the scope of the present disclosure and are defined by the scope of the claims. Throughout the specification, like reference numerals refer to like elements. Accordingly, in some exemplary embodiments, well-known operations of a process, well-known structures, and well-known technologies will be not described in detail to avoid obscurely understanding of the present disclosure.

The terms used herein are for explaining exemplary embodiments but not intended to limit the present disclosure. Throughout the specification, unless particularly defined otherwise, singular forms include plural forms. The terms "comprises" and/or "comprising" are used herein as meanings which do not exclude presence or addition of one or more other components, stages, and/or operations in addition to stated components, stages, and/or operations. Also, "and/or" includes each and one or more combinations of stated items.

Also, embodiments disclosed herein will be described with reference to perspective views, cross-sectional views, side views, and/or schematic diagrams, which are exemplary views of the present disclosure. Accordingly, modifications may be made in the form of exemplary views by a manufacturing technology, an allowable error, and/or the like. Accordingly, the exemplary embodiments of the present disclosure will not be limited to particular forms shown in the drawings and include changes made by a manufacturing process. Also, throughout the drawings of the present disclosure, components may be slightly exaggerated or contracted in consideration of convenience of description.

Figure 2:
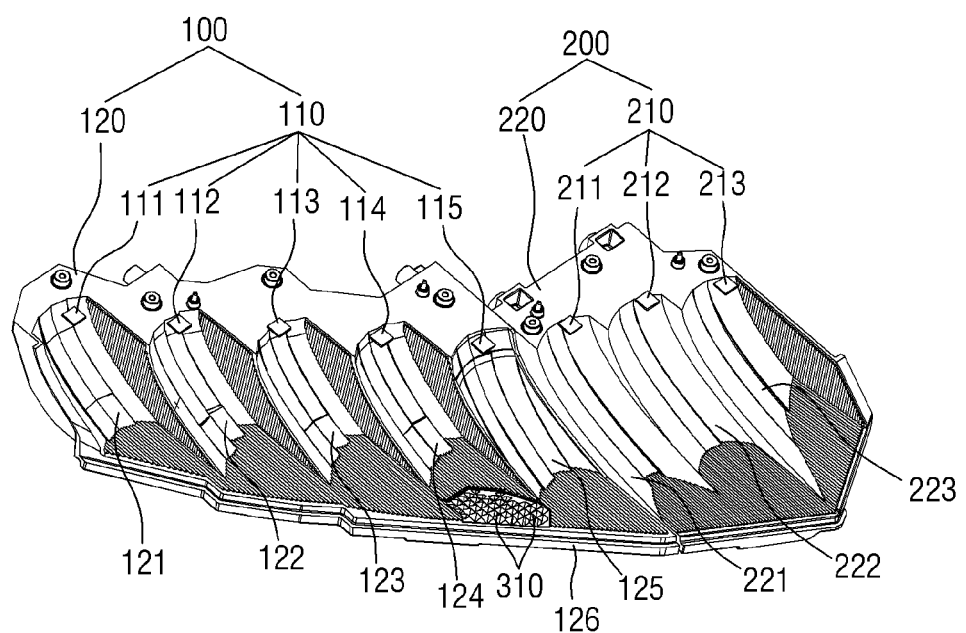
Figure 3:
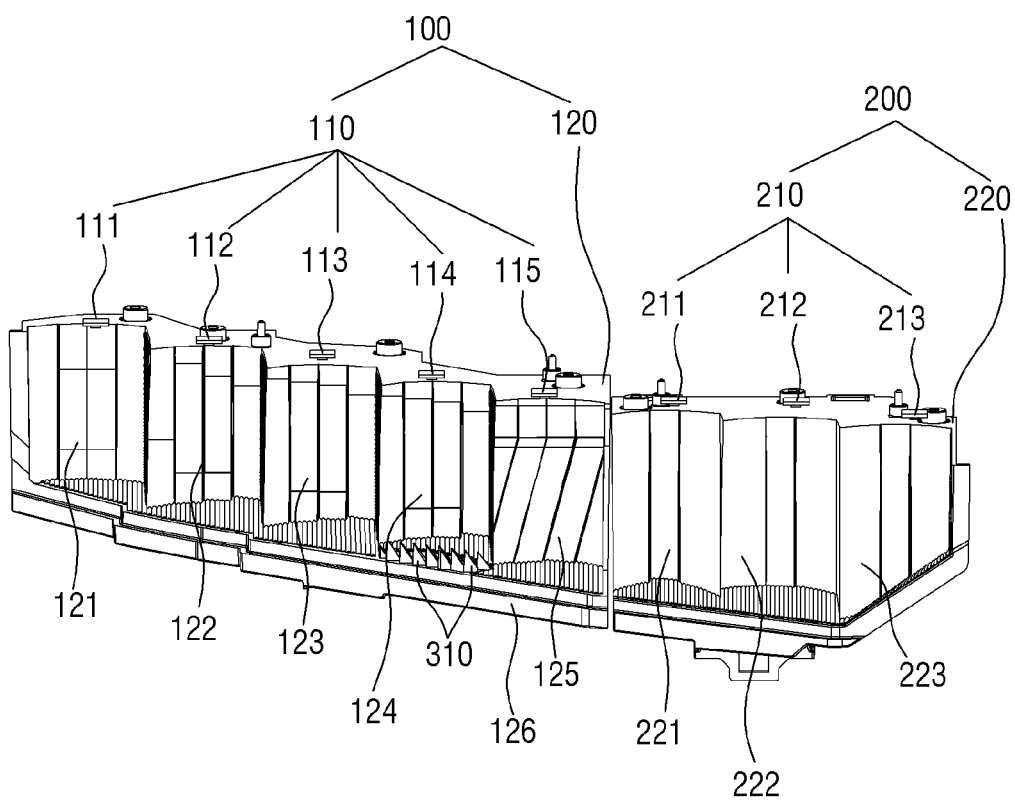
FIG. 3 is an exemplary front view of the lamp for the vehicle according to an exemplary embodiment of the present disclosure.
Figure 4:
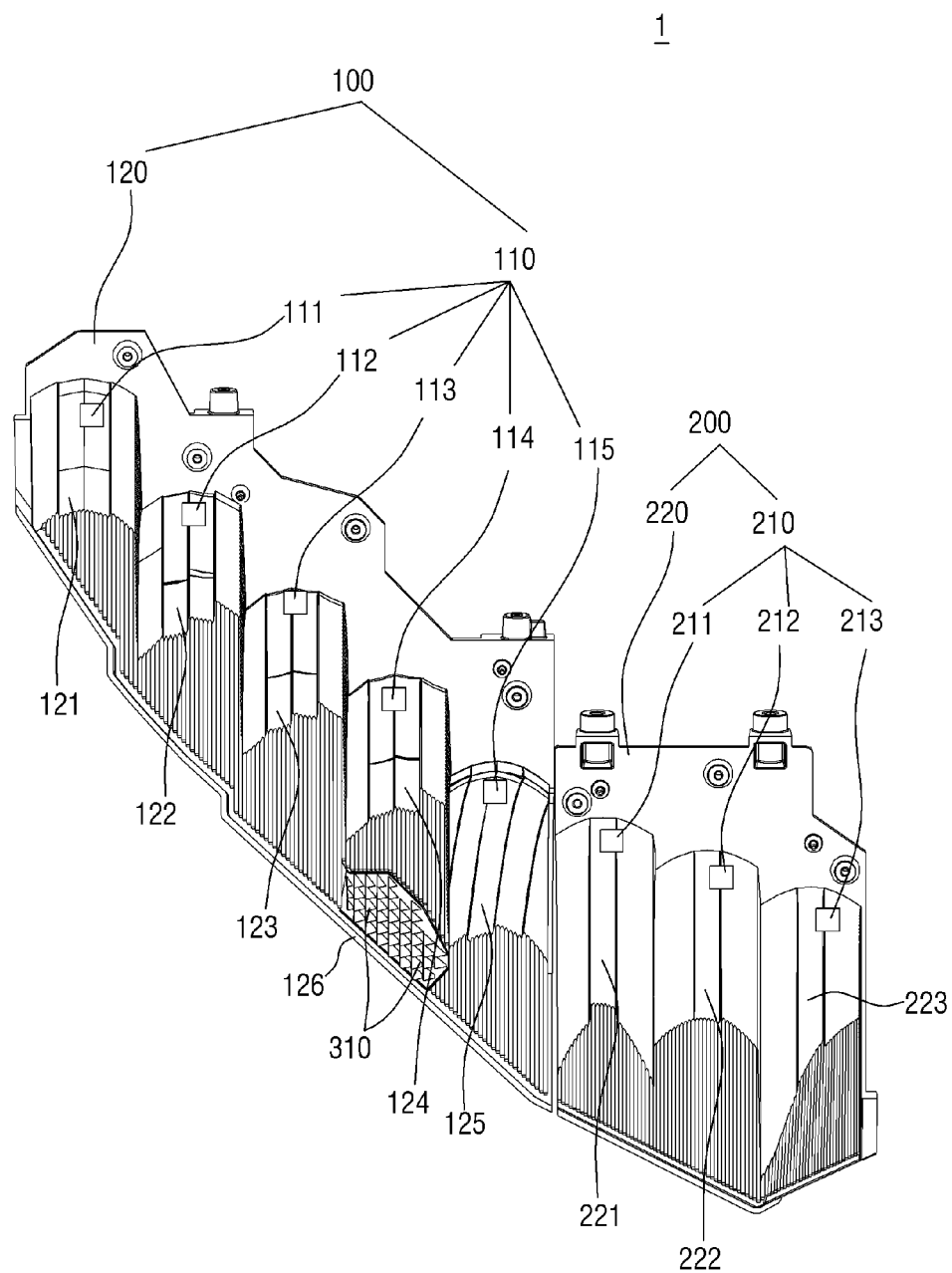
FIG. 4 is an exemplary plan view of the lamp for the vehicle according to an exemplary embodiment of the present disclosure.

Hereafter, a lamp for a vehicle according to exemplary embodiments of the present disclosure will be described with reference to the drawings. FIGS. 1 and 2 are exemplary perspective views of a lamp for a vehicle according to an exemplary embodiment of the present disclosure. FIG. 3 is an exemplary front view of the lamp for the vehicle according to an exemplary embodiment of the present disclosure. FIG. 4 is an exemplary plan view of the lamp for the vehicle according to an exemplary embodiment of the present disclosure. Referring to FIGS. 1 to 4, a lamp 1 for a vehicle according to an exemplary embodiment of the present disclosure may include a first lamp unit 100 and a second lamp unit 200.

In the exemplary embodiments of the present disclosure, the lamp 1 may be a headlamp for providing a front view in a vehicle when the vehicle is traveling during low light conditions (e.g., at night or through a dark place such as a tunnel and the like), but is not limited thereto. The lamp 1 may be used as a headlamp, and also as any of a variety of lamps installed in a vehicle (e.g., a daytime running lamp, a fog lamp, a tail lamp, a brake lamp, a backup lamp, and the like). The lamp 1 may form a variety of beam patterns based on driving conditions of the vehicle (e.g., road conditions, weather conditions, other vehicles near the vehicle, and the like). For example, when the lamp 1 is used as a head lamp, a low beam pattern or a high beam pattern may be formed based on driving conditions of the vehicle.

Additionally, in the exemplary embodiments of the present disclosure, the lamp 1 may include the first lamp unit 100 and the second lamp unit 200. However, the lamp 1 is not limited thereto and may include a variety of components such as a lamp housing which accommodates the first lamp unit 100 and the second lamp unit 200, a lens coupled to the lamp housing, and the like, and the components included in the lamp 1 may be varied based on a beam pattern.

The first lamp unit 100 and the second lamp unit 200 may be arranged in a direction of the vehicle's width. In the exemplary embodiments of the present disclosure, the first lamp unit 100 may form a first beam pattern, and the second lamp unit 200 may be disposed to be further inside the vehicle than the first lamp unit 100 and may form a second beam pattern. However, the first lamp unit 100 and the second lamp unit 200 are not limited thereto and the second lamp unit 200 may be disposed closer to the exterior of the vehicle than the first lamp unit 100. The first lamp unit 100 may include a first light source portion 110 and a first reflection portion 120.

Figure 5:
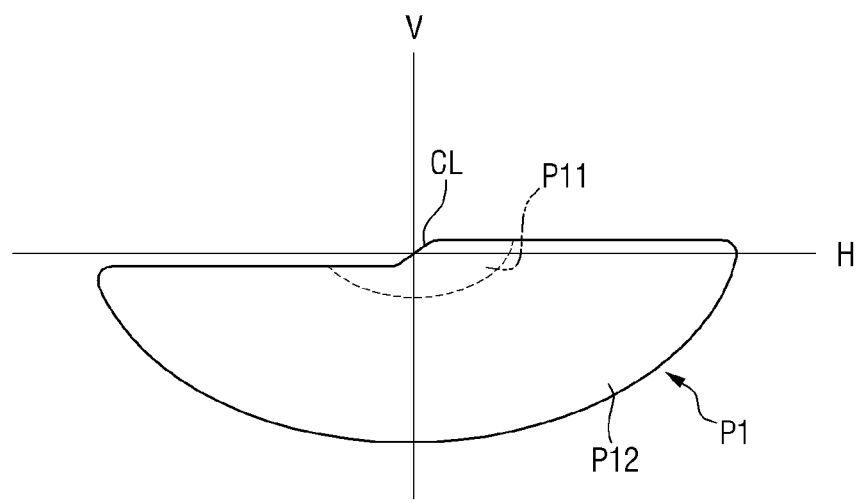
FIG. 5 is an exemplary schematic diagram illustrating a first beam pattern according to an exemplary embodiment of the present disclosure.

In the exemplary embodiments of the present disclosure, the first lamp unit 100 may form a low beam pattern, as shown in FIG. 5, which may include a first beam pattern and may have a certain cut-off line CL to prevent a driver of a vehicle in front or a vehicle approaching in an opposite lane from becoming blinded. The first beam pattern P1 may include a high illuminance area P11 which has relatively higher illuminance to provide an adequate view distance in front of the vehicle and a spread area P12 which provides a wide view of a short distance in front of the vehicle.

The first light source portion 110 may include one or more light sources 111, 112, 113, 114, and 115 and may generate light having a light amount or a color adequate to form the first beam pattern P1. In an exemplary embodiment of the present disclosure, first light source portion 110 may include a plurality of such light sources 111, 112, 113, 114, and 115. However, the number of light sources included in the first light source portion 110 may be varied based on the beam pattern, the light amount, or the like. Additionally, in an exemplary embodiment of the present disclosure, light emitting diodes (LEDs) may be used as the plurality of light sources 111, 112, 113, 114, and 115. However, the plurality of light sources 111, 112, 113, 114, and 115 are not limited thereto and may be a variety of types of light sources such as bulbs and the like in addition to semiconductor light emitting devices such as LEDs.

The first reflection portion 120 may reflect light generated by the first light source portion 110 in a forward direction of the vehicle. In an exemplary embodiment of the present disclosure, forward-reflection of light by the first reflection portion 120 may refer to reflecting light in a direction in which light is emitted by the lamp 1 for the vehicle according to the exemplary embodiment of the present disclosure. Accordingly, a direction of "forward" may vary based on a position or installation direction of the lamp 1 for the vehicle according to the embodiment of the present disclosure.

The first reflection portion 120 may include one or more reflection surfaces 121, 122, 123, 124, and 125. In an exemplary embodiment of the present disclosure, the first reflection portion 120 may include a plurality of reflection surfaces 121, 122, 123, 124, and 125 that may be arranged in a direction of the vehicle's width. Each of the plurality of reflection surfaces 121, 122, 123, 124, and 125 may form at least one of the cut-off line CL, the high illuminance area P11, and the spread area P12 of the first beam pattern. For example, in an exemplary embodiment of the present disclosure, the number of light sources included in the first light source portion 110 may be identical to the number of reflection surfaces included in the first reflection portion 120, and light generated by each light source may be reflected by a single reflector each. However, the light sources and reflectors are not limited thereto, and two or more reflectors may reflect light generated by one light source and vice versa.

Figure 6:
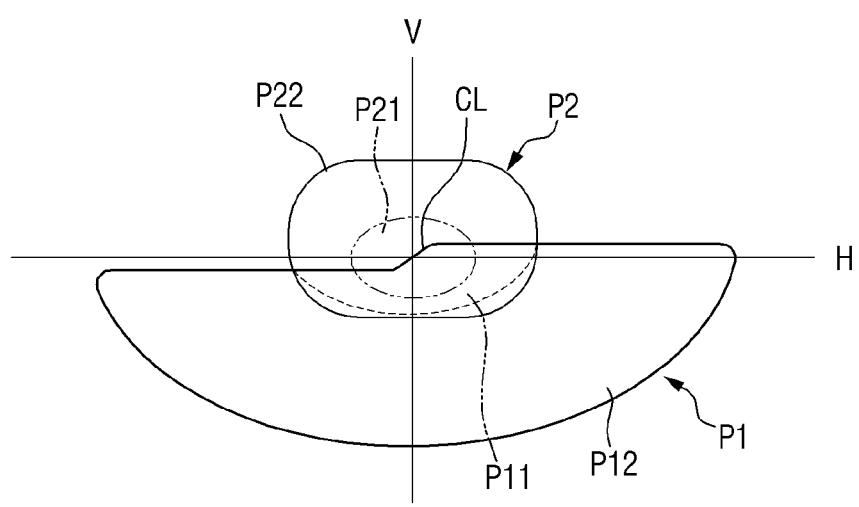
FIG. 6 is an exemplary schematic diagram illustrating the first beam pattern and a second beam pattern according to an exemplary embodiment of the present disclosure.

The second lamp unit 200 may include a second light source portion 210 and a second reflection portion 220. In an exemplary embodiment of the present disclosure, the second lamp unit 200, as shown in FIG. 6, may form a long distance view pattern for providing a long distance view as a second beam pattern P2 proximate to a top of the first beam pattern p1 and the second beam pattern P2 may include a high illuminance area P21 and a spread area P22.

A high beam pattern may be formed by the second lamp unit 200 forming the second beam pattern P2 together with the first beam pattern P1 formed by the first lamp unit 100. The second light source portion 210 may include one or more light sources 211, 212, and 213. In an exemplary embodiment of the present disclosure, the second light source portion 210 may include a plurality of such light sources 211, 212, and 213. Additionally, the second reflection portion 220 may include one or more reflection surfaces 221, 222, and 223 which reflect light generated by the light sources 211, 212, and 213 of the second light source portion 210 in a forward direction.

In an exemplary embodiment of the present disclosure, the second reflection portion 220 may include a plurality of reflection surfaces 221, 222, and 223 that may be arranged in a direction of the vehicle's width similar to the first reflection portion 120. For example, each of the plurality of reflection surfaces 221, 222, and 223 may form at least one of the high illuminance area P21 and the spread area P22 of the second beam pattern P2.

As described above, at least one of the first lamp unit 100 and the second lamp unit 200 may be turned on when a low beam pattern or a high beam pattern is formed. When the low beam pattern is formed, since light is not emitted toward an area corresponding to the second lamp unit 200 among areas toward which light is emitted from the lamp 1 for the vehicle a lighting image which is formed may be unnatural. Accordingly, in an exemplary embodiment of the present disclosure, when the first lamp unit 100 is turned on and the second lamp unit 200 is turned off to form a low beam pattern, a lighting image of the second lamp unit 200 may be formed to form a lighting image which is natural. In particular, the first lamp unit 100 may include at least one main reflection pattern 310 which is formed at an outer wall portion 126 on at least one side of the first reflection portion 120 and may reflect at least a part of light generated from the first light source portion 110 to the second reflection portion 220. The at least one main reflection pattern 310 may be formed from a part of a reflection surface which has an elliptical shape or a parabolic shape or the like. In an exemplary embodiment of the present disclosure, the at least one main reflection pattern 310 may be formed from a part of a reflection surface having an elliptical shape with improved light directivity to allow light reflected thereby to be transmitted to the second reflection portion 220.

In an exemplary embodiment of the present disclosure, the at least one main reflection pattern 310 may reflect light, which is generated by the first light source portion 110 and which may deviate from at least one of the plurality of reflection surfaces 121, 122, 123, 124, and 125, toward the second reflection portion 220. Accordingly, light which is not substantially used to form the first beam pattern P1 may be used and the may be used light more efficiently.

For example, the at least one main reflection pattern 310 may be formed on the outer wall portion 126 formed at a bottom end of the first reflection portion 120. In particular, the first light source portion 110 may be disposed above the first reflection portion 120 and may generate light in a downward direction. Depending on positions of the first light source portion 110 and the first reflection portion 120, positions of the outer wall portion 126 and the at least one main reflection pattern 310 may be changed. The at least one main reflection pattern 310 may have a variety of incline angles or curvatures based on a direction in which light is to be reflected. In an exemplary embodiment of the present disclosure, a plurality of main reflection patterns 310 may be included and arranged front and rear to reflect light generated by the first light source portion 110 toward the second reflection portion 220.

For example, the at least one main reflection pattern 310 may be formed at a bottom end of a reflection surface which forms the spread area P12 of the first beam pattern P1 among the plurality of reflection surfaces 121, 122, 123, 124, and 125 of the first reflection portion 120. Accordingly, a reflection surface which forms the high illuminance area P11 of the first beam pattern P1 may reflect light toward the high illuminance area P11 to a maximum extent to increase illuminance.

Figure 7:
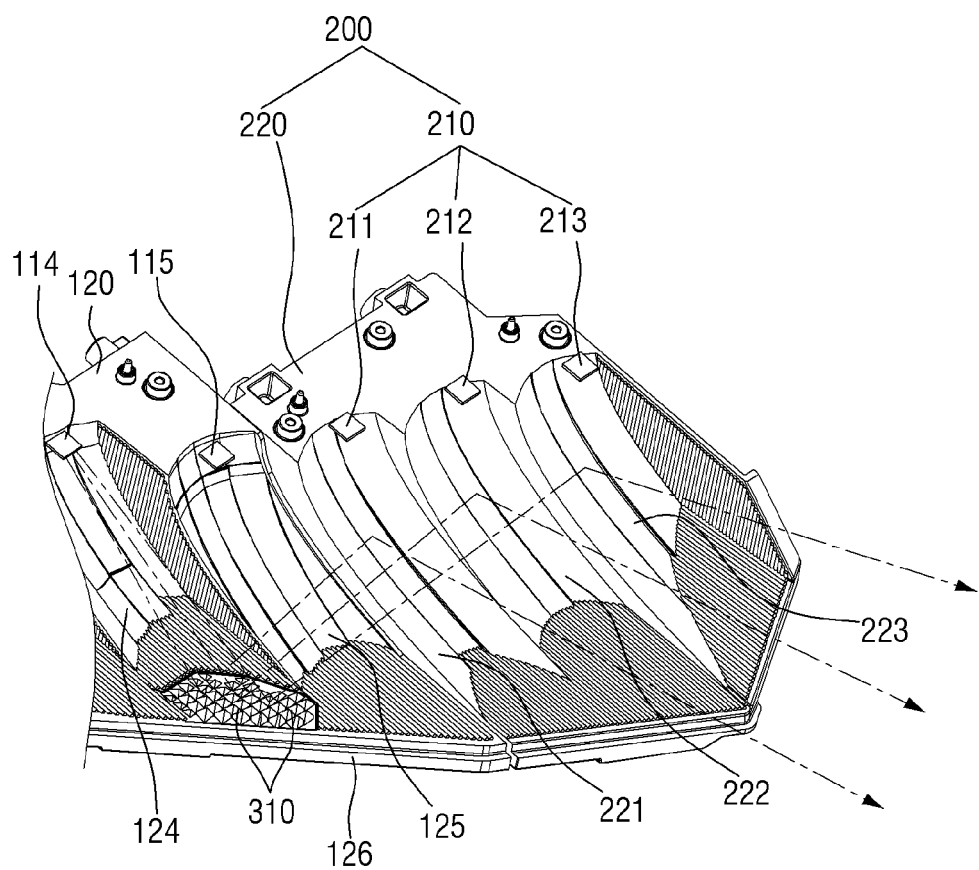
FIG. 7 is an exemplary schematic diagram illustrating a path of light reflected by a main reflection pattern according to an exemplary embodiment of the present disclosure.
Figure 8:
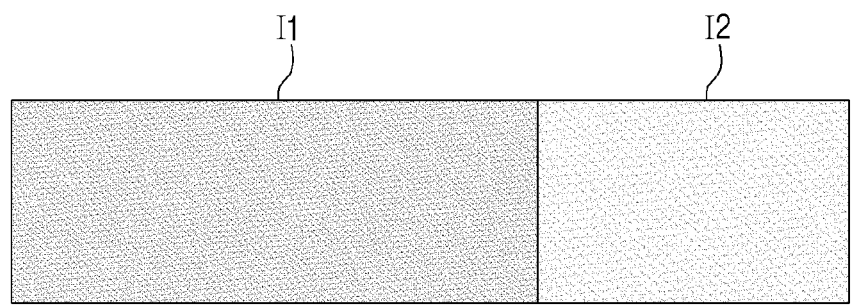
FIG. 8 is an exemplary schematic diagram illustrating a lighting image formed by the lamp for the vehicle according to an exemplary embodiment of the present disclosure.

As described above, light reflected by the at least one main reflection pattern 310 may be reflected toward at least one of the plurality of reflection surfaces 221, 222, and 223 of the second reflection portion 220 as shown in FIG. 7. In particular, even when the second light source portion 210 is turned off as shown in FIG. 8, a lighting image I1 formed by the first lamp unit 100 and a lighting image I2 formed by the second lamp unit 200, which has a relatively low brightness level, may be formed together to form a lighting image which is natural overall.

In an exemplary embodiment of the present disclosure the at least one main reflection pattern 310 may be formed at a front and a rear of the outer wall portion 126 formed at the bottom end of the first reflection portion 120. One of the main reflection patterns 310, which is formed in the rear, may reflect light toward one reflection surface, disposed at a position adjacent to the first reflection portion 120, among the plurality of reflection surfaces 221, 222, and 223 of the second reflection portion 220. One of the main reflection patterns 310, which is formed in the front, may reflect light toward one reflection surface, disposed at a position separate from the first reflection portion 120, among the plurality of reflection surfaces 221, 222, and 223 of the second reflection portion 220.

Further, in the above-described exemplary embodiment, light may be directly reflected by the at least one main reflection pattern 310 toward the plurality of reflection surfaces 221, 222, and 223. However, the light reflected by the at least one main reflection pattern 310 is not limited thereto and may be reflected toward the plurality of reflection surfaces 221, 222, and 223 by at least one additional reflection pattern formed on an outer wall portion formed on at least one side of the second reflection portion 220. For example, the at least one additional reflection pattern may be formed of a part of a reflection surface which has an elliptical shape or a parabolic shape like the above-described at least one main reflection pattern 310, and may be formed from a part of a reflection surface having an elliptical shape with an improved light directivity to allow light reflected thereby to travel to the second reflection portion 220.

Figure 9:
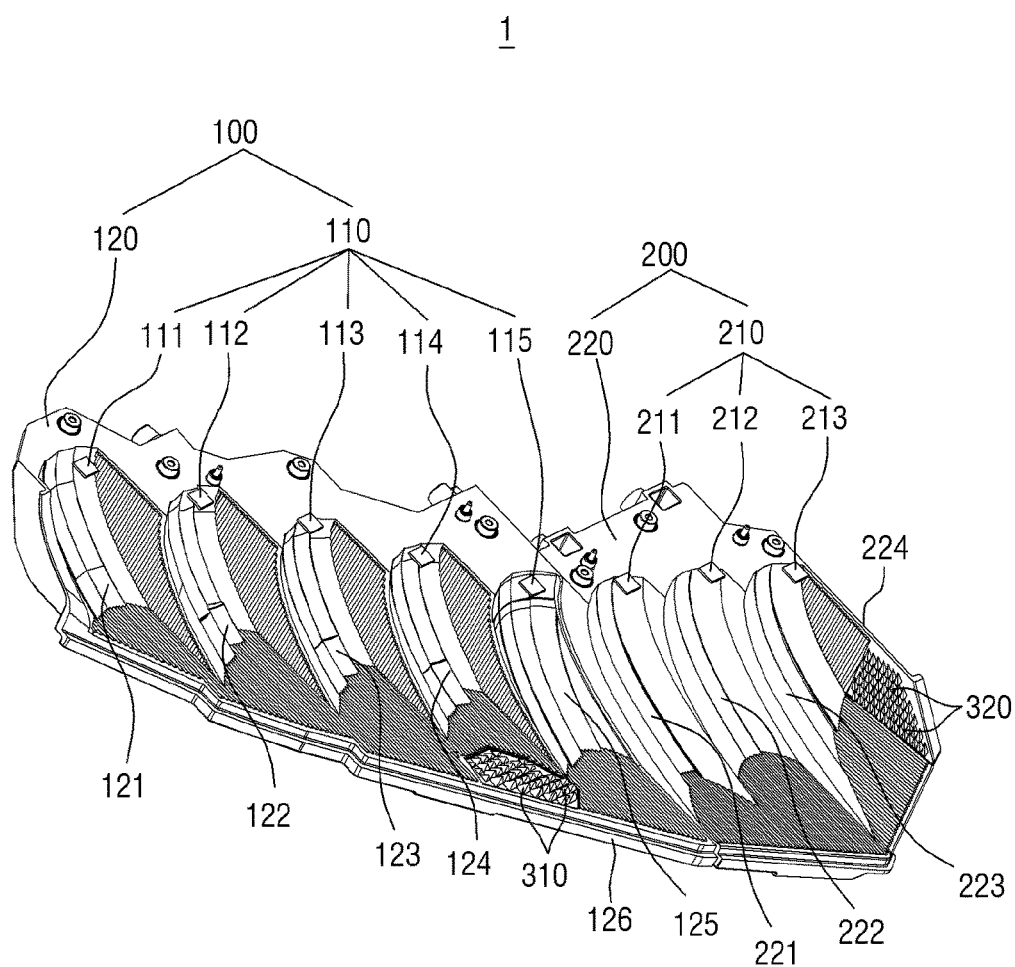
FIG. 9 is an exemplary perspective view of a lamp for a vehicle according to another exemplary embodiment of the present disclosure.
Figure 10:
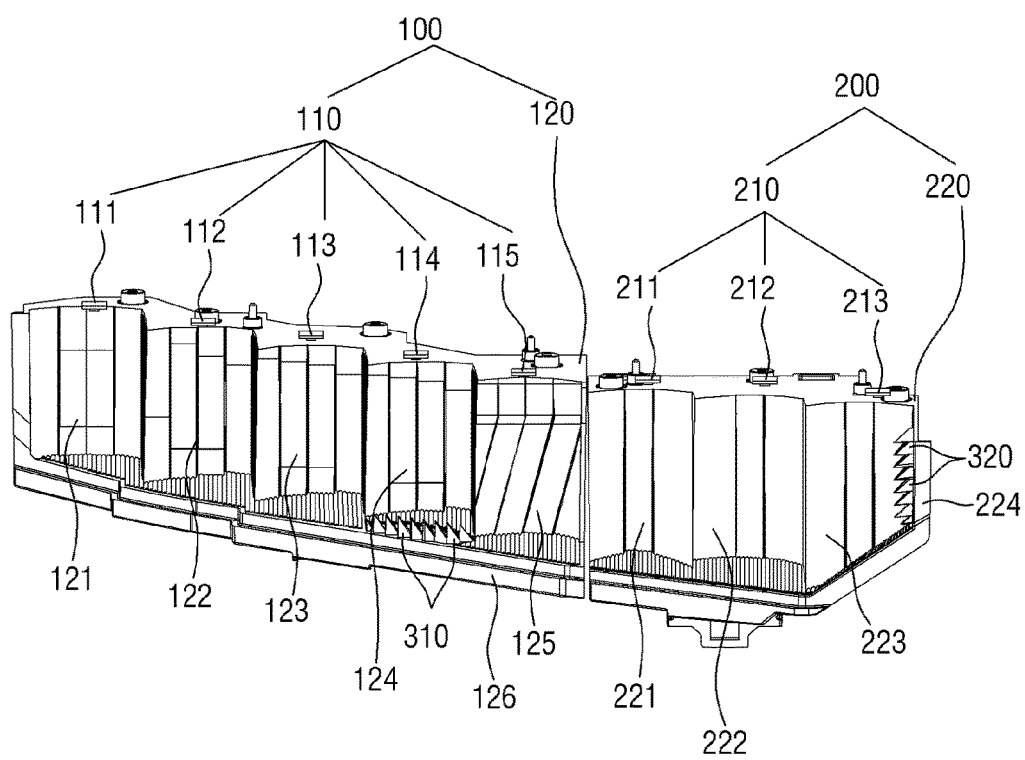
FIG. 10 is an exemplary front view of the lamp for the vehicle according to another exemplary embodiment of the present disclosure.
Figure 11:
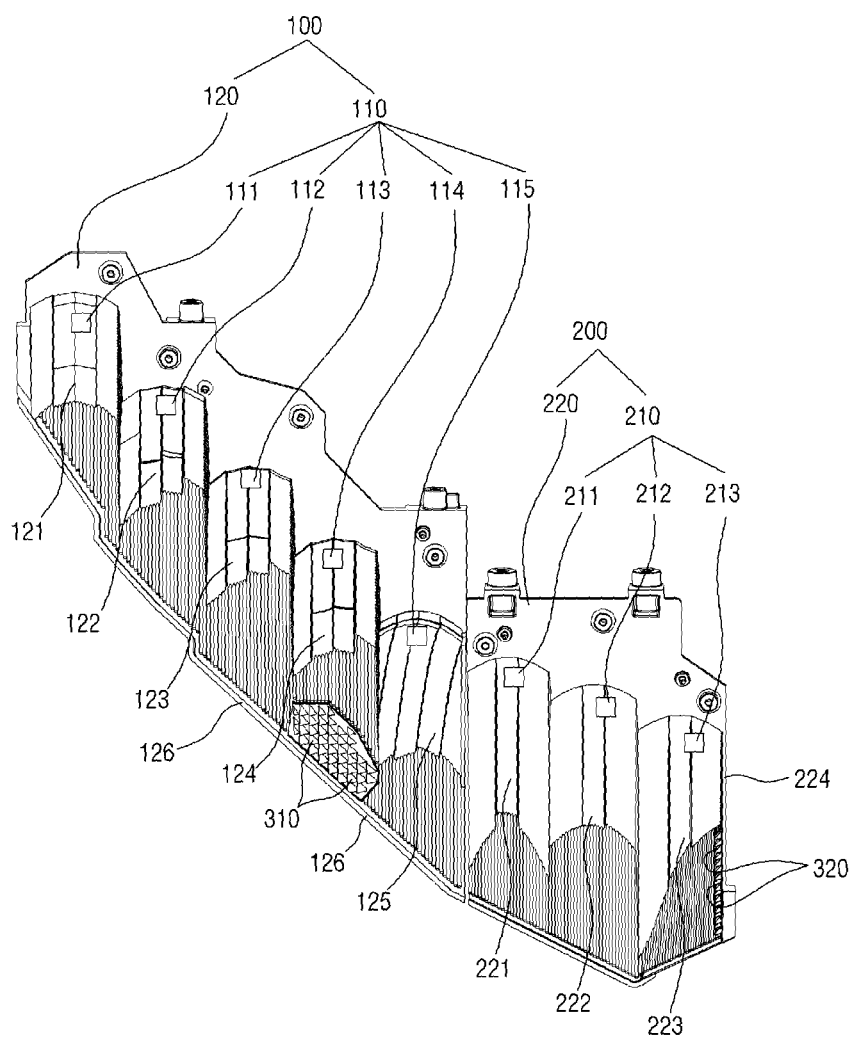
FIG. 11 is an exemplary plan view of the lamp for the vehicle according to another exemplary embodiment of the present disclosure.

FIG. 9 is an exemplary perspective view of a lamp for a vehicle according to another exemplary embodiment of the present disclosure. FIG. 10 is an exemplary front view of the lamp for the vehicle according to another exemplary embodiment of the present disclosure. FIG. 11 is an exemplary plan view of the lamp for the vehicle according to another exemplary embodiment of the present disclosure. Referring to FIGS. 9 to 11, a lamp 1 for a vehicle according to another exemplary embodiment of the present disclosure, like the above-described embodiment, may include a first lamp unit 100 having a first light source portion 110 and a first reflection portion 120, and may include a second lamp unit 200 having a second light source portion 210 and a second reflection portion 220. In another exemplary embodiment of the present disclosure, components having the same functions as those of the above-described exemplary embodiment will be referred to using the same reference numerals and a detailed description thereof will be omitted.

In another exemplary embodiment of the present disclosure, at least one main reflection pattern 310 may reflect at least a portion of light generated by the first light source portion 110 toward at least one additional reflection pattern 320 formed on an outer wall portion 224 formed on at least one side of the second reflection portion 220. In another exemplary embodiment of the present disclosure, the outer wall portion 224 of the second reflection portion 220 may be disposed adjacent to (e.g., beside or proximate) the second reflection portion 220, on an inside of the vehicle.

Figure 12:
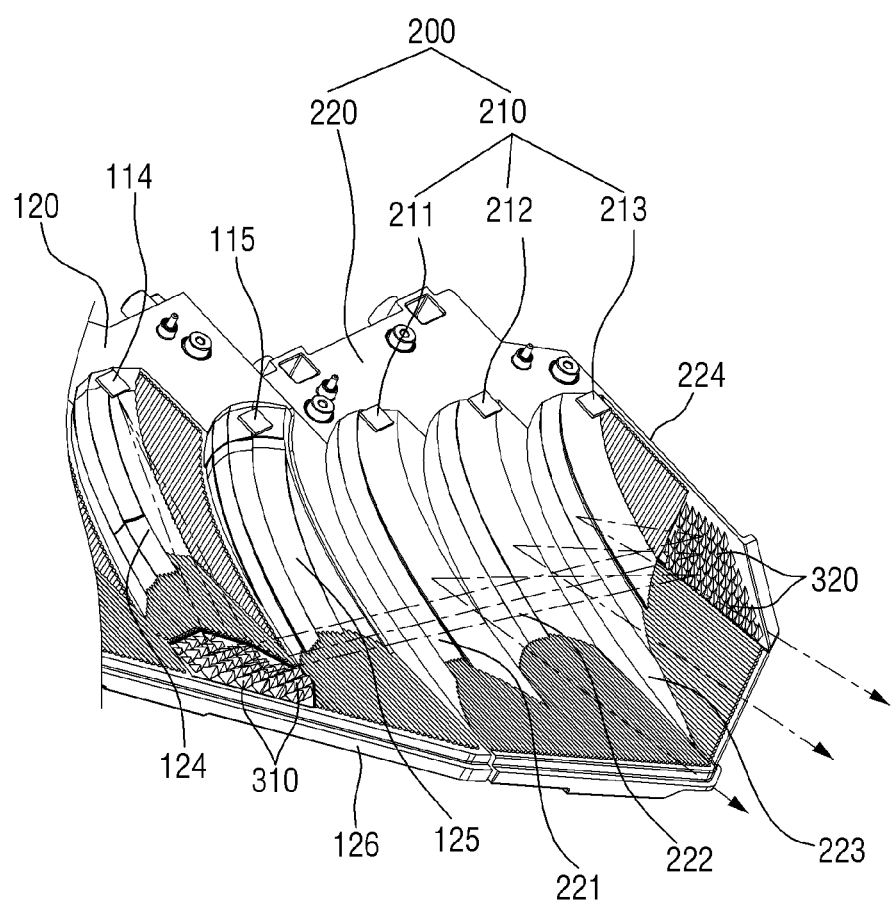
FIG. 12 is an exemplary schematic diagram illustrating an optical path of the lamp for the vehicle according to another exemplary embodiment of the present disclosure.

Additionally, the at least one additional reflection pattern 320 may be formed in a vertical direction of the outer wall portion 224. As shown in FIG. 12, one additional reflection pattern disposed above may reflect light toward one reflection surface, disposed adjacent to the outer wall portion 224, among the plurality of reflection surfaces 221, 222, and 223 of the second reflection portion 220. Another additional reflection pattern disposed below may reflect light toward one reflection surface, disposed separate (e.g., far or spaced apart) from the outer wall portion 224, among the plurality of reflection surfaces 221, 222, and 223 of the second reflection portion 220.

Figure 13:
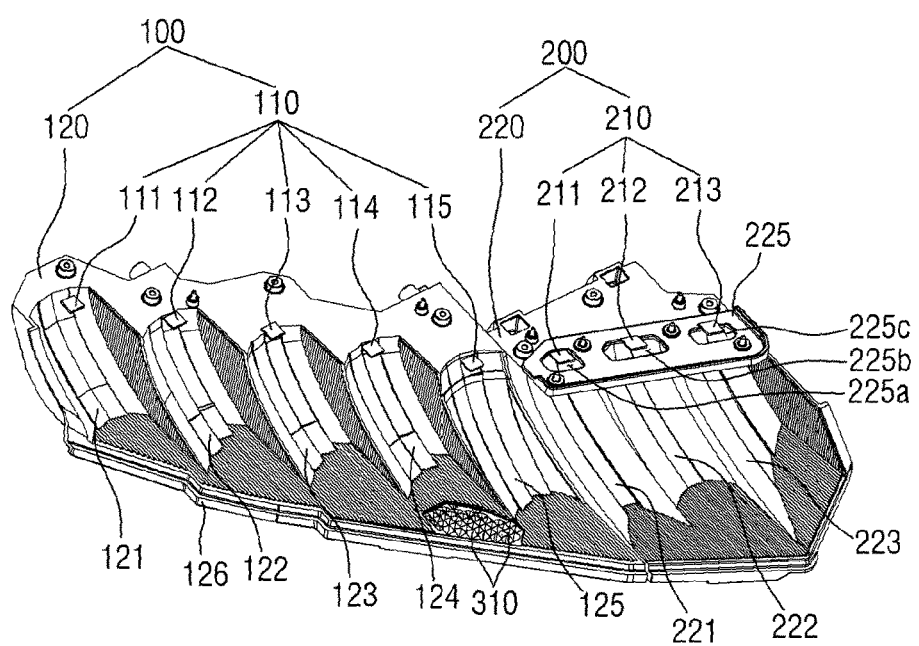
FIG. 13 is an exemplary perspective view of a lamp for a vehicle according to another exemplary embodiment of the present disclosure.
Figure 14:
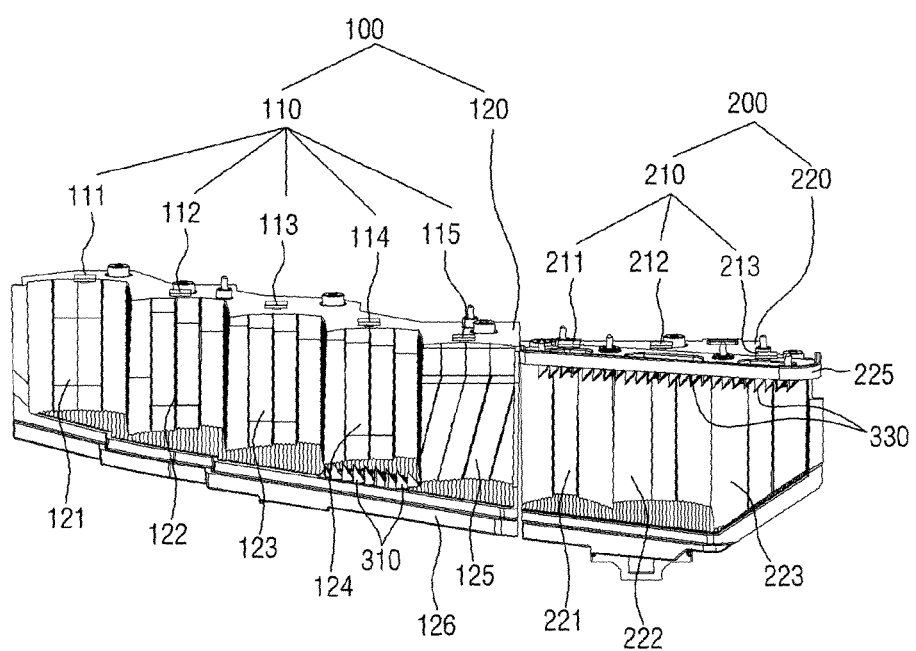
FIG. 14 is an exemplary front view of the lamp for the vehicle according to another exemplary embodiment of the present disclosure.
Figure 15:
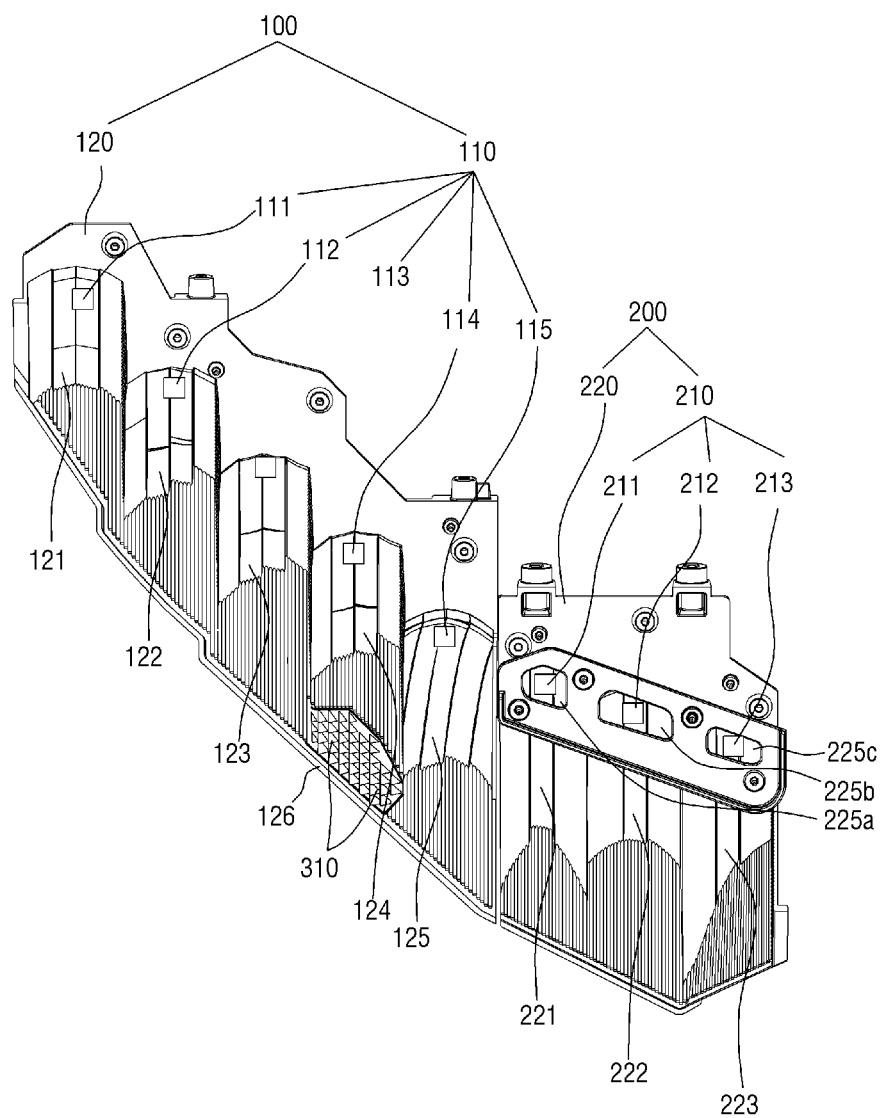
FIG. 15 is an exemplary plan view of the lamp for the vehicle according to another exemplary embodiment of the present disclosure.

When the at least one additional reflection pattern 320 formed on the outer wall portion 224 of the second reflection portion 220 reflects the light reflected by the at least one main reflection pattern 310 toward at least one of the plurality of reflection surfaces 221, 222, and 223 of the second reflection portion 220 as described above, a lighting image I1 formed by the first lamp unit 100 and a lighting image I2 formed by the second lamp unit 200 may be formed together when the second light source portion 210 is turned off as shown in FIG. 8. FIG. 13 is an exemplary perspective view of a lamp for a vehicle according to another exemplary embodiment of the present disclosure. FIG. 14 is an exemplary front view of the lamp for the vehicle according to another exemplary embodiment of the present disclosure. FIG. 15 is an exemplary plan view of the lamp for the vehicle according to another exemplary embodiment of the present disclosure.

Referring to FIGS. 13 to 15, a lamp 1 for a vehicle according to an exemplary embodiment of the present disclosure may, like the above-described exemplary embodiment, include a first lamp unit 100 having a first light source portion 110 and a first reflection portion 120, and may include a second lamp unit 200 having a second light source portion 210 and a second reflection portion 220. In another exemplary embodiment of the present disclosure, components having the same functions as those of the above-described exemplary embodiments will be referred to using the same reference numerals and a detailed description thereof will be omitted.

Figure 16:
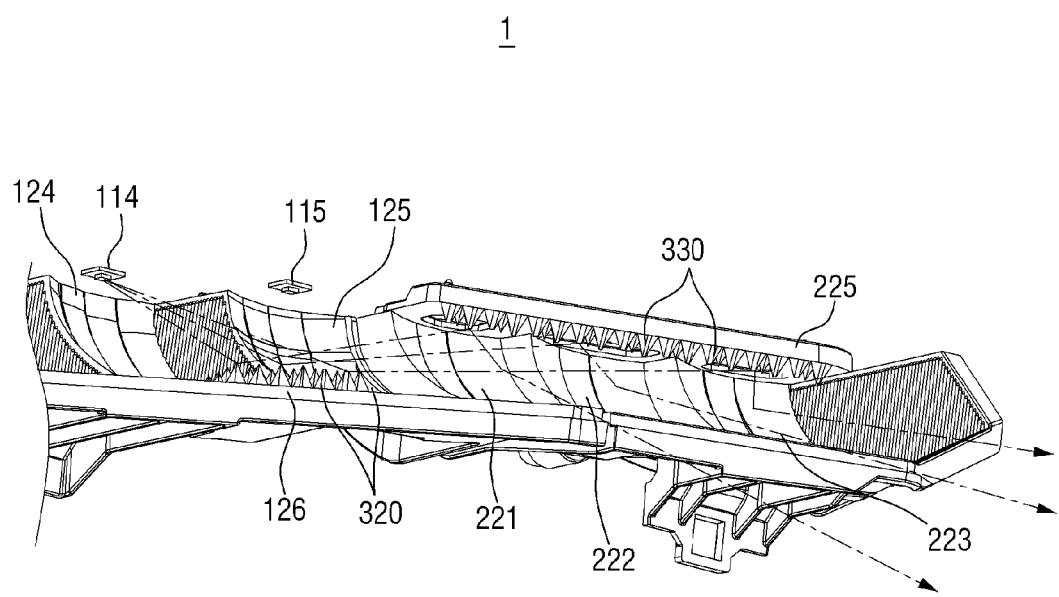
FIG. 16 is an exemplary schematic diagram illustrating an optical path of the lamp for the vehicle according to another exemplary embodiment of the present disclosure.

In an exemplary embodiment of the present disclosure, at least one additional reflection pattern 330 may be formed on an outer wall portion 225 disposed on a top end of the second reflection portion 220 and may reflect light reflected by at least one main reflection pattern 310 toward at least one of a plurality of reflection surfaces 221, 222, and 223 of the second reflection portion 220, as shown in FIG. 16. Accordingly, lighting image I1 formed by the first lamp unit 100 and a lighting image I2 formed by the second lamp unit 200 may be formed together even when the second light source portion 210 is turned off as shown in FIG. 8.

For example, in another exemplary embodiment of the present disclosure, the at least one additional reflection pattern 330 may reflect the light reflected by the at least one main reflection pattern 310 toward at least one of the plurality of reflection surfaces 221, 222, and 223. One main reflection pattern 310 formed in the rear may reflect light toward one additional reflection pattern 330 formed on the outer wall portion 225 at a position adjacent to the first reflection portion 120. Another main reflection pattern 310 formed in the front may reflect light toward another additional reflection pattern 330 formed on the outer wall portion 225 at a position separated (e.g., far or spaced apart) from the first reflection portion 120.

In another exemplary embodiment of the present disclosure, the outer wall portion 225 disposed at a top end of the second reflection portion 220 may include a plurality of apertures 225a, 225b, and 225c to allow light generated by a plurality of light sources 211, 212, and 213 of the second light source portion 210 to be directed toward the plurality of reflection surfaces 221, 222, and 223 but is not limited thereto, and the plurality of apertures 225a, 225b, and 225c may be omitted based on a position of the second light source portion 210.

Since it is possible to obtain a light generation effect from the second light source portion 210 when at least one additional reflection pattern 330 is formed on the outer wall portion 225 disposed at the top end of the second reflection portion 220 as described above, aesthetics may be improved and an external appearance may be prevented from being deteriorated. In other words, when the at least one additional reflection pattern 330 is formed on the outer wall portion 225 disposed at the top end of the second reflection portion 220, the at least one additional reflection pattern 330 may be formed at a bottom surface of the outer wall portion 225 to reflect light toward the second reflection portion 220 disposed below the outer wall portion 225, the at least one additional reflection pattern 330 may be prevented from being viewed from the exterior to thereby prevent deterioration of the external appearance. In addition, since an effect similar to light generation may be obtained from the second light source portion 210, the aesthetics may be improved.

In the above-described embodiments, two cases in which the additional reflection patterns 320 and 330 are formed on the outer wall portions 224 and 225 disposed adjacent to or above the second reflection portion 220 have been described as distinct from each other but are not limited thereto and may be combined.

As described above, when a low beam pattern is formed, the lamp 1 for the vehicle of the exemplary embodiments of the present disclosure may form the lighting image I1 formed by the first lamp unit 100 and the lighting image I2 formed by the second lamp unit 200 using the above-described at least one main reflection pattern 310, the at least one additional reflection pattern 320, and the like. Accordingly, a natural overall lighting image may be formed. Therefore, when the low beam pattern is formed the formation of an unnatural lighting image caused by a lighting image not being formed by the second lamp unit 200 may be prevented.

According to a lamp for a vehicle according to an exemplary embodiment of the present disclosure, one or more effects may be provided as follows. When a portion of a plurality of lamp units are turned off to form a specific beam pattern, a lighting image may still be formed from the turned-off lamp units, and a more natural lighting image may be formed.

It should be understood by one of ordinary skill in the art that the present disclosure can be modified in other detailed forms without changing the technical concept and essential features of the present disclosure. Therefore, the above-described exemplary embodiments should be understood to be exemplary and not to be limitative in every aspect. The scope of the present disclosure will be defined by the following claims rather than the above detailed description, and all changes and modifications derived from the meaning and the scope of the claims and equivalents thereof should be understood as being included in the scope of the present disclosure.

What is claimed is:

1. A lamp for a vehicle, comprising:
a first lamp unit that includes a first light source portion and a first reflection portion having a reflection surface which forms a first beam pattern by reflecting light generated by the first light source portion in a forward direction; and
a second lamp unit that is disposed on one side of the first lamp unit and includes a second light source portion and a second reflection portion having a reflection surface which forms a second beam pattern by reflecting light generated by the second light source portion in the forward direction,
wherein the first lamp unit includes a main reflection pattern formed on an outer wall portion disposed on a side of the first reflection portion and configured to reflect a part of the light generated by the first light source portion to be incident to the second reflection portion to allow the reflected part of the light generated by the first light source portion to be emitted from the second lamp unit.

2. The lamp of claim 1, wherein the first lamp unit and the second lamp unit are arranged in a direction of the vehicle's width, and the first lamp unit is disposed closer to the exterior of the vehicle than the second lamp unit.

3. The lamp of claim 1, wherein the first beam pattern is a low beam pattern, the second beam pattern is a long distance view pattern for providing a long distance view and is combined with the low beam pattern to form a high beam pattern.

4. The lamp of claim 1, wherein the first reflection portion comprises:
a first reflection surface which forms a high illuminance area for the first beam pattern; and
a second reflection surface which forms a spread area for the first beam pattern, and
wherein the main reflection pattern is disposed on a side of the reflection surface which forms the spread area.

5. The lamp of claim 1, wherein the first light source portion is disposed above the first reflection portion, and the main reflection pattern is formed on the outer wall portion formed at a bottom end of the first reflection portion.

6. The lamp of claim 1, wherein the second reflection portion includes a plurality of reflection surfaces, and the main reflection pattern reflects light toward at least one of the plurality of reflection surfaces.

7. The lamp of claim 1, wherein the second reflection portion includes an additional reflection pattern which is formed on an outer wall portion disposed on a side of the second reflection portion and reflects light reflected by the main reflection pattern toward the second reflection portion.

8. The lamp of claim 7, wherein the second reflection portion includes a plurality of reflection surfaces, and the additional reflection pattern reflects light reflected by the main reflection pattern toward at least one of the plurality of reflection surfaces.

9. The lamp of claim 7, wherein the additional reflection pattern is formed on an outer wall portion disposed adjacent the second reflection portion.

10. The lamp of claim 7, wherein the additional reflection pattern is formed on an outer wall portion disposed at a top end of the second reflection portion.

11. The lamp of claim 1, wherein the first lamp unit forms a first lighting image by using light generated from the first light source portion, and the second lamp unit forms a second lighting image by using light reflected by the main reflection pattern among the light generated from the first light source portion.

12. The lamp of claim 11, wherein a brightness level of the second lighting image is less than a brightness level of the first lighting image.

* * * * *